United States Patent
Hamilton, II et al.

(10) Patent No.: US 9,100,435 B2
(45) Date of Patent: Aug. 4, 2015

(54) PREFERRED NAME PRESENTATION IN ONLINE ENVIRONMENTS

(75) Inventors: Rick A. Hamilton, II, Charlottesville, VA (US); Richard J. Newhook, Cherry Hill, NJ (US); Martin S. Ramsey, Bristol, CT (US); James W. Seaman, Falls Church, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 216 days.

(21) Appl. No.: 12/416,967

(22) Filed: Apr. 2, 2009

(65) Prior Publication Data
US 2010/0257222 A1 Oct. 7, 2010

(51) Int. Cl.
*G06F 15/16* (2006.01)
*H04L 29/12* (2006.01)

(52) U.S. Cl.
CPC ...... *H04L 61/1511* (2013.01); *H04L 29/12066* (2013.01); *H04L 61/301* (2013.01)

(58) Field of Classification Search
USPC .......................................... 709/203, 206, 217
See application file for complete search history.

(56) References Cited

U.S. PATENT DOCUMENTS

| | | |
|---|---|---|
| 5,604,855 A | 2/1997 | Crawford |
| 5,802,296 A | 9/1998 | Morse et al. |
| 5,956,039 A | 9/1999 | Woods et al. |
| 6,215,498 B1 | 4/2001 | Filo et al. |
| 6,329,986 B1 | 12/2001 | Cheng |
| 6,476,830 B1 | 11/2002 | Farmer et al. |
| 6,545,682 B1 | 4/2003 | Ventrella et al. |
| 6,591,291 B1 * | 7/2003 | Gabber et al. ............... 709/206 |
| 6,643,687 B1 * | 11/2003 | Dickie et al. ............... 709/206 |
| 7,213,206 B2 | 5/2007 | Fogg |
| 7,342,587 B2 | 3/2008 | Danzig et al. |
| 7,386,799 B1 | 6/2008 | Clanton et al. |
| 7,401,295 B2 | 7/2008 | Aldrich et al. |
| 7,669,123 B2 | 2/2010 | Zuckerberg et al. |
| 7,673,003 B2 | 3/2010 | Little, II |
| 7,698,380 B1 | 4/2010 | Amidon et al. |
| 7,703,030 B2 | 4/2010 | Smirin et al. |
| 7,725,492 B2 | 5/2010 | Sittig et al. |
| 7,801,971 B1 | 9/2010 | Amidon et al. |
| 7,802,290 B1 | 9/2010 | Bansal et al. |
| 7,930,255 B2 | 4/2011 | Choi et al. |
| 8,332,913 B2 | 12/2012 | Dawson et al. |
| 8,677,254 B2 | 3/2014 | Finn et al. |
| 2002/0065795 A1 * | 5/2002 | Asherman ........................ 707/1 |
| 2003/0014423 A1 | 1/2003 | Chuah et al. |

(Continued)

OTHER PUBLICATIONS

Langberg, Mike, "Virtual World There Innovative to an Extend", San Jose Mercury News, Nov. 27, 2003 (pp. 1-3).

(Continued)

*Primary Examiner* — Vivek Srivastava
*Assistant Examiner* — Normin Abedin
(74) *Attorney, Agent, or Firm* — Lisa Ulrich, Esq.; Kevin P. Radigan, Esq.; Heslin Rothenberg Farley & Mesiti P.C.

(57) ABSTRACT

The present invention allows an on-line user to specify the name by which that user is known when communicating with other target users, regardless of the name under which the sending user is currently logged-in. The invention also provides a mechanism to block messages from sending parties that are not willing to divulge their real identity.

18 Claims, 6 Drawing Sheets

(56) References Cited

U.S. PATENT DOCUMENTS

| | | | |
|---|---|---|---|
| 2003/0177187 | A1 | 9/2003 | Levine et al. |
| 2004/0064734 | A1* | 4/2004 | Ehrlich .................. 713/201 |
| 2004/0148346 | A1 | 7/2004 | Weaver et al. |
| 2004/0179039 | A1 | 9/2004 | Blattner et al. |
| 2004/0192386 | A1 | 9/2004 | Aerrabotu et al. |
| 2004/0205173 | A1* | 10/2004 | Hall ......................... 709/223 |
| 2004/0221224 | A1 | 11/2004 | Blattner et al. |
| 2004/0255122 | A1* | 12/2004 | Ingerman et al. ............ 713/176 |
| 2005/0022206 | A1 | 1/2005 | Evans et al. |
| 2005/0143138 | A1 | 6/2005 | Lee et al. |
| 2005/0223328 | A1 | 10/2005 | Ashtekar et al. |
| 2006/0009994 | A1 | 1/2006 | Hogg et al. |
| 2006/0053388 | A1 | 3/2006 | Michelman |
| 2006/0053389 | A1 | 3/2006 | Michelman |
| 2006/0059238 | A1* | 3/2006 | Slater et al. ................. 709/206 |
| 2006/0062363 | A1* | 3/2006 | Albrett ..................... 379/101.01 |
| 2006/0128460 | A1 | 6/2006 | Muir et al. |
| 2006/0148528 | A1 | 7/2006 | Jung et al. |
| 2006/0248573 | A1 | 11/2006 | Pannu et al. |
| 2007/0093299 | A1 | 4/2007 | Bergeron et al. |
| 2007/0162862 | A1 | 7/2007 | Ogasawara et al. |
| 2007/0243936 | A1 | 10/2007 | Binenstock et al. |
| 2008/0020361 | A1 | 1/2008 | Kron et al. |
| 2008/0030496 | A1 | 2/2008 | Lee et al. |
| 2008/0086696 | A1 | 4/2008 | Sri Prakash et al. |
| 2008/0092225 | A1 | 4/2008 | Nieuwenhuis |
| 2008/0120376 | A1 | 5/2008 | Allsop |
| 2008/0120558 | A1 | 5/2008 | Nathan et al. |
| 2008/0201638 | A1 | 8/2008 | Nair |
| 2008/0207331 | A1 | 8/2008 | Beale |
| 2009/0037822 | A1 | 2/2009 | Kandekar et al. |
| 2009/0106672 | A1* | 4/2009 | Burstrom ..................... 715/757 |
| 2009/0150418 | A1 | 6/2009 | Shuster |
| 2009/0157813 | A1 | 6/2009 | Jung et al. |
| 2009/0163278 | A1 | 6/2009 | Kawanaka et al. |
| 2009/0172539 | A1 | 7/2009 | Bates et al. |
| 2009/0240629 | A1 | 9/2009 | Xie et al. |
| 2009/0307189 | A1* | 12/2009 | Bobbitt et al. .................. 707/3 |
| 2010/0164947 | A1 | 7/2010 | Bolger et al. |
| 2010/0250605 | A1 | 9/2010 | Pamu et al. |
| 2010/0273546 | A1 | 10/2010 | Lior et al. |
| 2011/0078088 | A1 | 3/2011 | Dawson et al. |

OTHER PUBLICATIONS

Duncan, Geoff, "Second Life Rolls Out ID Verification", Aug. 31, 2007, http://news.digitaltrends.com/news/story/14051/second_life_rolls_out_id_verification (1 page).

Selvarajah et al., "The Use of Emotions to Create Believable Agents in a Virtual Environment", AAMAS'05, Utrecht, Netherlands (Jul. 25-29, 2005) (pp. 13-20).

Jackson et al., "Collaboration and Learning Within Immersive Virtual Reality", CVE Jan. 2000, San Fransisco, CA (pp. 83-92).

Maldonado et al., "We Learn Better Together: Enhancing e-Learning with Emotional Characters", Computer Supportive Collaborative Learning: The Next Ten Years, Proceedings of the 6th International Computer Supported Collaborative Learning Conference (CSCL) (May 30, 2005) (pp. 408-417).

Zanbaka et al., "Can a Virtual Cat Persuade You? The Role of Gender and Realism in Speaker Persuasiveness", CHI 2006 Proceedings, Beliefs and Affect, Montreal, Quebec, Canada, (Apr. 22-27, 2006) (pp. 1153-1162).

Bailenson et al., "Interaction in Collaborative Virtual Environments", Presence, vol. 15, No. 6 (Dec. 2006) (pp. 669-716).

* cited by examiner

PREFERRED NAME PRESENTATION IN ONLINE ENVIRONMENTS

CROSS REFERENCE TO CO-PENDING APPLICATION

Commonly owned U.S. patent application Ser. No. 12/045,757, entitled "Fraud Mitigation through Avatar Identity Determination," filed on Mar. 11, 2008, contains subject matter related, in certain aspects, to the subject matter of the present application. The above-identified patent application is incorporated herein by reference in its entirety.

FIELD OF THE INVENTION

The present invention is generally directed to a system and method for providing an avatar, that is, a user having an on-line alias, with a mechanism for communicating with other users electronically, and based on context, present a desired name to the target party regardless of the currently active alias of the sender. More particularly, the present invention is directed to processes and systems variously described as Alias Resolution, Name Resolution, Alias Translation, Name Translation, Alias Conversion and Name Conversion in virtual universes.

BACKGROUND OF THE INVENTION

In a virtual environment, alias names are used to preserve privacy, and yet there is often a need to know the identity of the real person with whom one is talking or interacting in order to hold meetings and conduct business. The inverse is also true, where an on-line user does not want to disclose a real name and wishes for disparate target parties to know the user under disparate on-line alias names. In modern society, most on-line users have multiple on-line alias names, some of which may include real identity data. As an example, a user's business e-mail address may contain a real name, where the same user may have additional email addresses, on-line gaming aliases, virtual world aliases, and the like, which often do not include identity data. As the world of on-line communication grows smaller, most of these environments provide external communication mechanisms, such as chat, so that an alias in one environment can communicate with an alias in a disparate environment. A problem arises, however, when an Avatar/alias needs to communicate to another on-line user, but does not wish to be known by the current on-line alias. As an example, a user currently playing World of Warcraft® may be logged-on using the alias MegaMonster. If that user has a need or desire to communicate with a business associate, it is unlikely that they would want to send an email, establish a chat session, or otherwise make contact using the identity of MegaMonster. This invention solves this problem by providing a system and method to control and manage identity presentation in on-line environments.

A virtual world is a computer-based simulated environment intended for its users to inhabit and interact via avatars. This habitation usually is represented in the form of two or three-dimensional graphical representations of humanoids (or other graphical or text-based avatars). Some, but not all, virtual worlds allow for multiple users.

The world being computer-simulated typically appears similar to the real world, with real world rules such as gravity, topography, locomotion, real-time actions, and communication. Communication has, until recently, been in the form of text, but now real-time voice communication using VOIP is available. This type of virtual world is now most common in massively multi-player on-line games (Second Life®, Entropia Universe®, The Sims On-Line™, There™, particularly massively multiplayer on-line role-playing games such as EverQuest®, Ultima On-Line™, Lineage™, World of Warcraft®, or Guild Wars™. Second Life® and other on-line virtual environments present a tremendous new outlet for both structured and unstructured virtual collaboration, gaming and exploration, as well as real-life simulations in virtual spaces. These activities, along with yet to be disclosed new dimensions, in turn provide a wide open arena for creative and new marketing methods and mechanisms.

It should not be assumed that the utility of virtual worlds is limited to game playing, although that is certainly seen to be useful and valuable insofar as it has become a real economic reality with real dollars being exchanged. However, the usefulness of virtual worlds also includes the opportunity to run corporate conferences and seminars. It is also used to conduct virtual world classroom sessions. Governmental and instructional opportunities abound in the virtual world. Accordingly, it should be fully appreciated that the term "virtual" as applied to this technology does not in any way make it less real or less valuable than the "real" world. It is really an extension of current reality. Moreover, it is an extension that greatly facilitates human communication and interaction in a non-face-to-face fashion.

SUMMARY OF THE INVENTION

The present invention allows an on-line user to specify the name or alias by which that user is known when communicating with other target users, regardless of the name or alias under which the sending user is currently logged-in. It also provides a mechanism to block messages from sending parties that are not willing to divulge real identity.

In accordance with one embodiment of the present invention a method is given for providing appropriate and selective identities for user messages in a virtual universe, by establishing an association between a user and at least two aliases for use on different accounts in the virtual universe. A name conversion agent, having target information and user defined rules for these aliases, is enabled. A user identity is determined by the name conversion agent using the target information, selected or specified rules and the alias information.

In a further embodiment of the present invention, a computer readable medium containing program instructions thereon, for a data processing system is provided. The data processing system establishes an association between the user and at least two aliases for use on different accounts in said virtual universe. The data processing system enables a name conversion agent having target information and user defined rules for the aliases and determines a user identity via the agent, using the target information, the rules and the aliases.

In yet a further embodiment of the present invention, there is described a data processing system whose memory includes program instructions, for: (1) establishing an association between the user and at least two aliases for use on different accounts in a virtual universe; (2) enabling a name conversion agent having target information and user defined rules for the aliases; and (3) determining a user identity by the agent using the target information, the rules and the aliases.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION OF THE INVENTION

The present invention is related to Ser. No. 12/045,757, "System for Fraud Mitigation through Avatar Identity Determination" where methods are described to ascertain the true identity of the human user behind an Avatar or other on-line alias. This invention expands upon the previous methods and provides controls for a message sender and target in managing name/alias presentation.

In order to better understand the present invention and the advantages that it produces, it is useful to provide descriptions of some of the VU concepts and terms that are encountered. The list below is exemplary and is not intended to be all inclusive.

(1) An avatar is a graphical representation a user selects that other users can see, often taking the form of a cartoon-like human but with increasing desire to render the depiction in more realistic fashion.

(2) An agent is the user's account, upon which the user can build an avatar, and which is tied to the inventory of assets a user owns.

(3) A region is a virtual area of land within the VU, typically residing on a single server.

(4) Assets, avatars, the environment, and anything visual consists of UUIDs (unique identifiers) tied to geometric data (distributed to users as textual coordinates), textures (distributed to users as graphics files such as JPEG2000 files), and effects data (rendered by the user's client according to the use's preferences and user's device capabilities).

Note too that, throughout this disclosure, for clarity of presentation only, reference is made to an individual or avatar, which is a digital representative of the individual. However, it should be noted that this term not only applies to an individual, but also to any computerized processes that may execute on behalf of the individual, using the same credentials and capabilities of the individual that owns/controls the process. In general, this embodies many forms, such as prescheduled, automatically running maintenance processes, system level processes (owned by the system administrator), etc. In all cases, this process is treated like an avatar, with the same inputs and outputs, regardless of whether the credentials come directly from an individual or from a computerized process acting in his or her stead.

Figure 3:
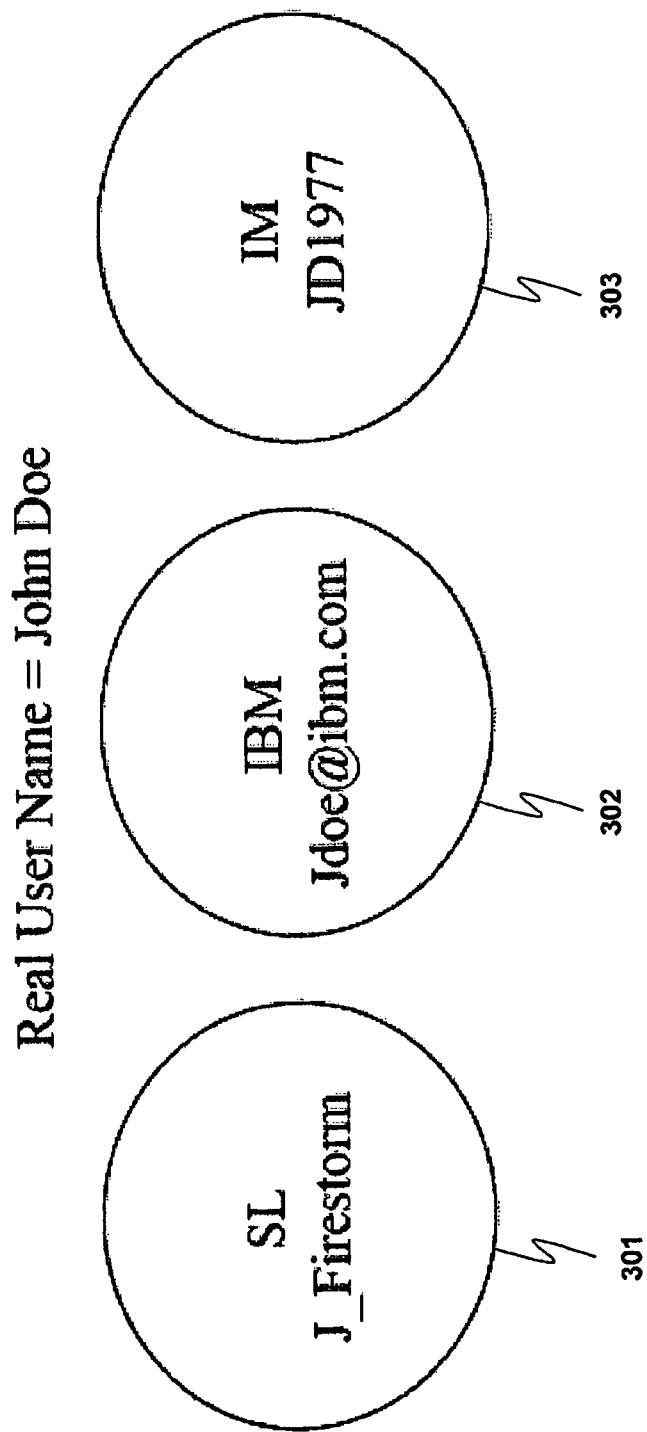
FIG. 3 is a block diagram illustrating the name conversion process as employed by a first client communicating with a second client.

The present invention allows an on-line user with multiple virtual identities (alias names) to communicate with other users while presenting a desired identity to a target party. As an example, real user John Doe may have a work account at IBM of jdoe@ibm.com (see reference numeral 302 in FIG. 3), a Second Life® account with an alias of J_Firestorm (see reference numeral 301 in FIG. 3), and an Instant Messenger (IM) account with an alias of JD1977 (see reference numeral 303 in FIG. 3). Each of these accounts is associated with John Doe, but each uses a different on-line alias name.

Figure 2:
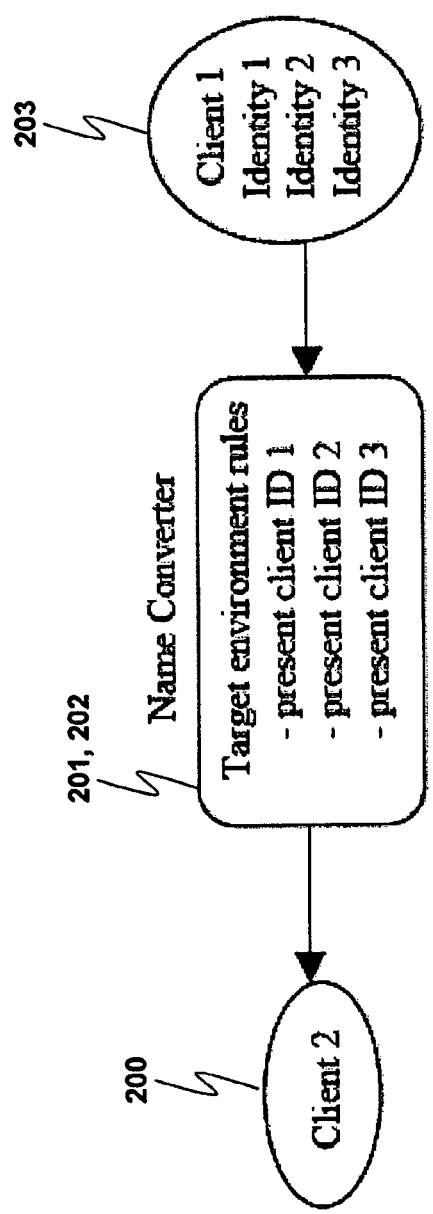
FIG. 2 illustrates a model in which a single real name is associated with three aliases.

The present invention enables user John Doe to communicate with others identifying himself as any of the alias names (see reference numeral 203 in FIG. 2), regardless of which alias is currently active. As an example, if John Doe is currently in an IM session and sends a note to a colleague at work, he could address such a note as coming from jdoe@ibm.com, even though the currently active IM ID is JD1977.

Figure 1:
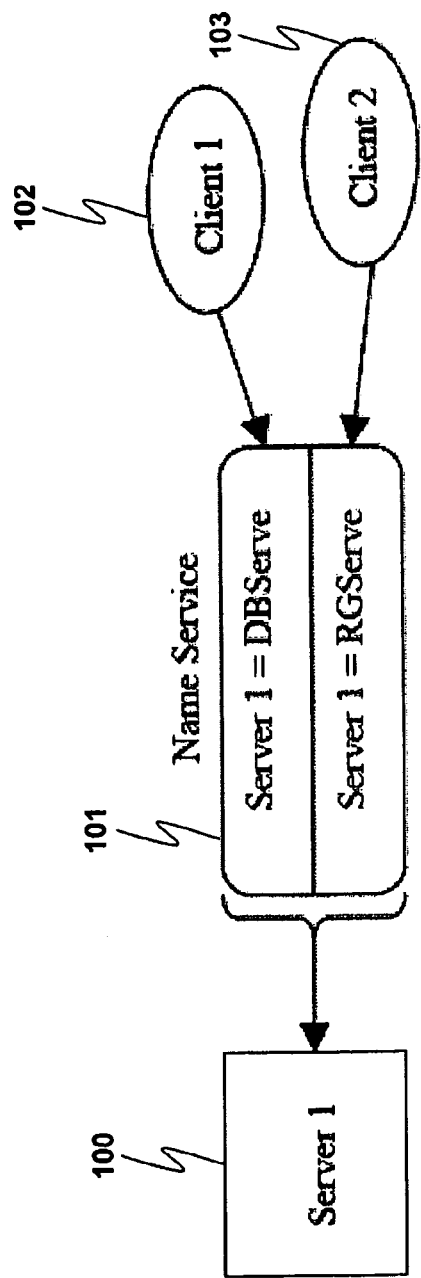
FIG. 1 is a block diagram illustrating the use of a name service by two clients communicating with a server such as one hosting a virtual world.

Name service solutions, such as Domain Name Services (DNS), exist in which multiple clients can refer to a single server by different names, and each client has the server name translated and connects to the server. However, the present invention is used so that the clients do not actually have to know the real name of the physical server in order to connect to a service. FIG. 1 depicts a name services scenario for clients (102 and 103) using name service 101 in order to access server 100.

Name Conversion Agent and Database

In a preferred embodiment, the present invention is enabled through the use of agent code and a name conversion database. A Name Conversion Agent runs on the client machine and, based on message context (target information) and user defined rules, either passes the message as is or modifies the sender's identify information according to the rules. In another embodiment, this functionality is integrated into the individual applications or is accomplished using an application programming interface (API).

Figure 4:
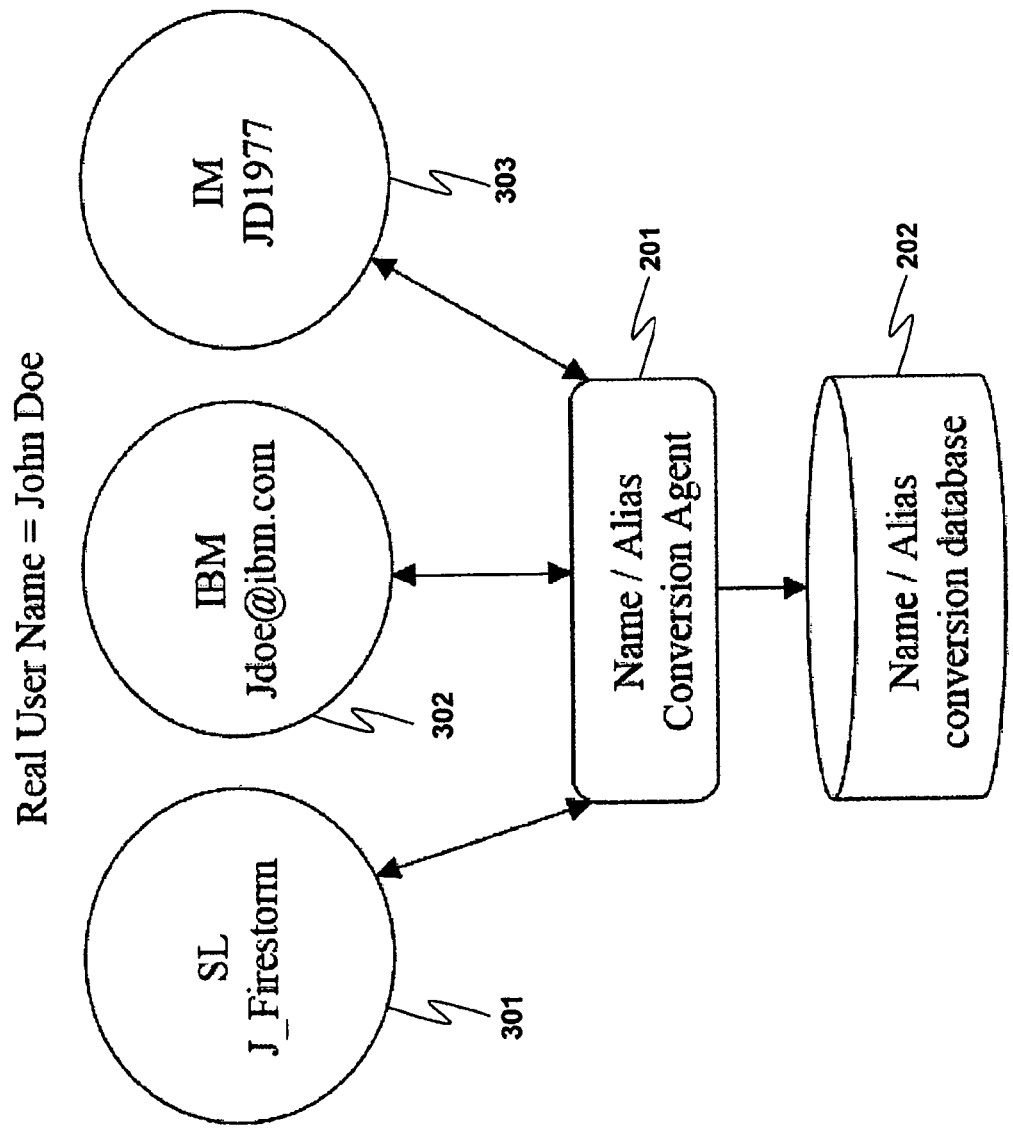
FIG. 4 is a process flow diagram illustrating the use of a name/alias conversion agent and a name/alias conversion database.

Additionally, in preferred embodiments there is a registration process in which user John Doe is only permitted to use alias IDs that he actually owns, and is not permitted to spoof another user's alias names. This is accomplished by sending a onetime message to the agent (see reference numeral 201 in FIG. 4) from each active ID. For example, during an IM session a user sends a message to NameAgent@IM to register new IM name. The Agent recognizes this as a registration request and adds JD1977 to the alias database (see reference numeral 202 in FIG. 4). Upon registration of an ID, John Doe then has the ability, through the agent, to establish rules for that ID. FIG. 4 depicts high level component interaction.

The present invention expands upon existing name services by providing a client with the ability to present a preferred identity to either an existing name service, to a server, or to another client, regardless of the current active client ID.

As each alias is registered and rules are configured, and the data is written to a name conversion database that stores each contextual relationship, thus establishing name association rules. In a preferred embodiment, data from the Name Conversion Database is cached by the agent such that name conversions are made very rapidly without the need to read the database for each message sent. The following describes some exemplary name conversion rules.

Name Conversion Rules

The rules now described are exemplary of rules that are desirable for use by the Name Conversion Agent. In preferred embodiments there are two rule sets: one describing specific relationship rules and another providing global rules. Upon receipt of a message, the agent first looks for a specific rule and applies it, followed by scanning global rules if no specific rule was found, and finally passing the message as-is if no rule was found. The following are examples of such rules.

Specific Name Conversion Rules

"Send-message-as" function (send using any valid registered alias)—This rule allows the sender to specify, in real-time, the sending ID that is associated with an outbound message.

Use specific sender name for messages to specific target environment—This rule governs all outbound traffic to a specific target environment. As an example, all messages sent to ibm.com are provided with a sending address of jdoe@ibm.com and all messages sent to Second Life® are provided with a sending address of J-Firestorm.

Use specific sender name to specific target name—This rule governs all outbound traffic to a specific target name. As an example, any messages sent to rick@ibm.com are provided with a sending address of jdoe@ibm.com and any messages sent to rick@aol.com are provided with a sending address of JD1977.

Global Name Conversion Rules

Always translate outbound name to real name—In the absence of any specific rule, this global rule would identify the sender by real name.

Always translate in-world name to in-world name—In the absence of any specific rule, this global rule uses the current contextually based name (for example, IBM name, Second Life® name, IM name)

Always translate other-world name to other-world name—In the absence of any specific rule, this global rule uses the target environment contextually based name. For example, a message sent to Second Life® is provided with a sending address of the sender's Second Life® identity.

Always send using current alias or name—In the absence of any specific rule, this global rule uses the currently active ID as the sender ID (for example, if sending from IM, use sender's IM name).

Blocking Rules

Block messages from all/some in-bound/out-bound unresolvable alias names—In a preferred embodiment, both a sender and receiver have the option of not sending and/or receiving messages from other parties that do not have a real name on record.

It should be noted that each of these rules are used individually and/or jointly to provide the desired outcome.

It should be further noted that the above rules can be applied:

With the use of either an avatar mode, for example, "personal" or "business" wherein any contacts made while the avatar is designated in a certain mode take on an alias translation accordingly.

According to who is being addressed; for example, entry of my manager's avatar name into a look-up table means that messaging addressed between the two of us refers to "Dan" and "Rick" whereas correspondence to others still uses informal names and aliases.

According to the region where the avatar is located. For example, if an avatar is in a corporate region, then real names are used, whereas an avatar in a public region uses the informal names associated with their avatar.

According to time of day or day of week in a designated "home" time zone.

For example, when interactions occur during working hours in the home zone, translation is performed accordingly; on a Sunday afternoon, no translation occurs. Time of year or season is also employed.

In yet another embodiment, the present invention provides a business method that performs the process steps of the invention on a subscription, advertising, and/or fee basis. That is, a service provider, such as a Solution Integrator, offers to provide a mechanism for providing selectively appropriate identity for user messages in a virtual universe. In this case, the service provider creates, maintains, supports, et cetera, a computer infrastructure that performs the process steps of the invention for one or more customers. In return, the service provider receives payment from the customer(s) under a subscription and/or fee agreement and/or the service provider receives payment from the sale of advertising content to one or more third parties.

Figure 7:
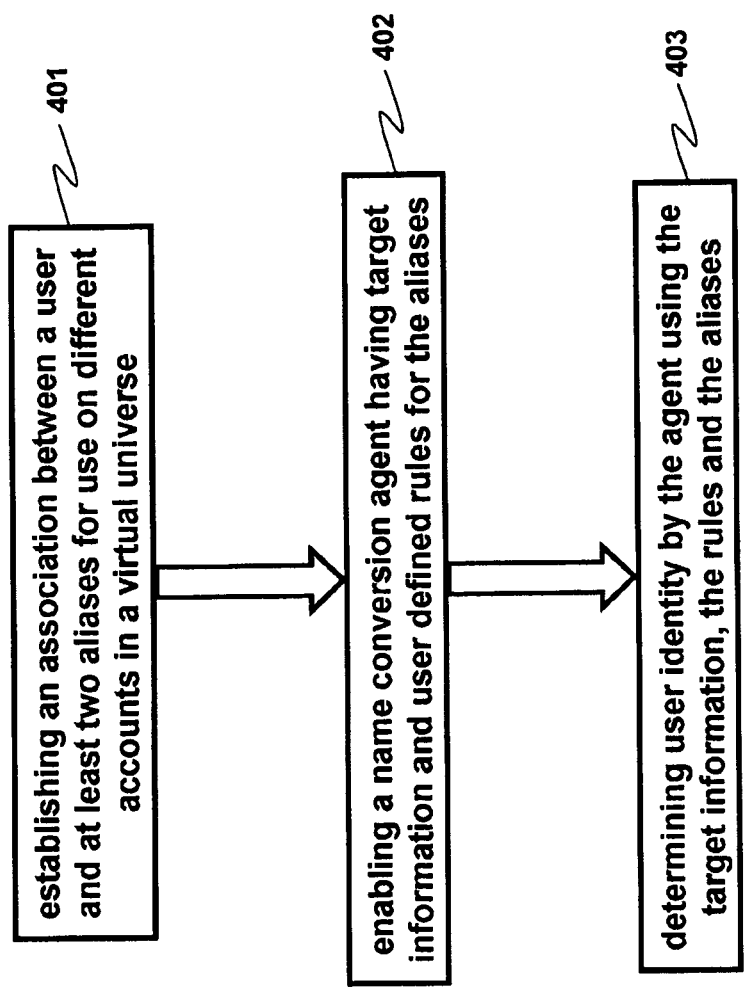
FIG. 7 is a flowchart illustrating exemplary steps in the process of the present invention.

One embodiment of the present invention is illustrated in FIG. 7. In a first step (401), there is established an association between a user and at least two aliases for use on different accounts in a virtual universe. In a second step (402), a name conversion agent having target information and user defined rules for the aliases is enabled. In a third step (403), user identity is determined by the agent using the target information, the rules and aliases.

In summary, this invention provides a convenient mechanism for sending messages to target parties using a desired sender alias without the need to start or change active applications, and is presently very helpful and its utility is only expected to grow as the number of alias identities each individual person owns continues to increase.

Figure 5:
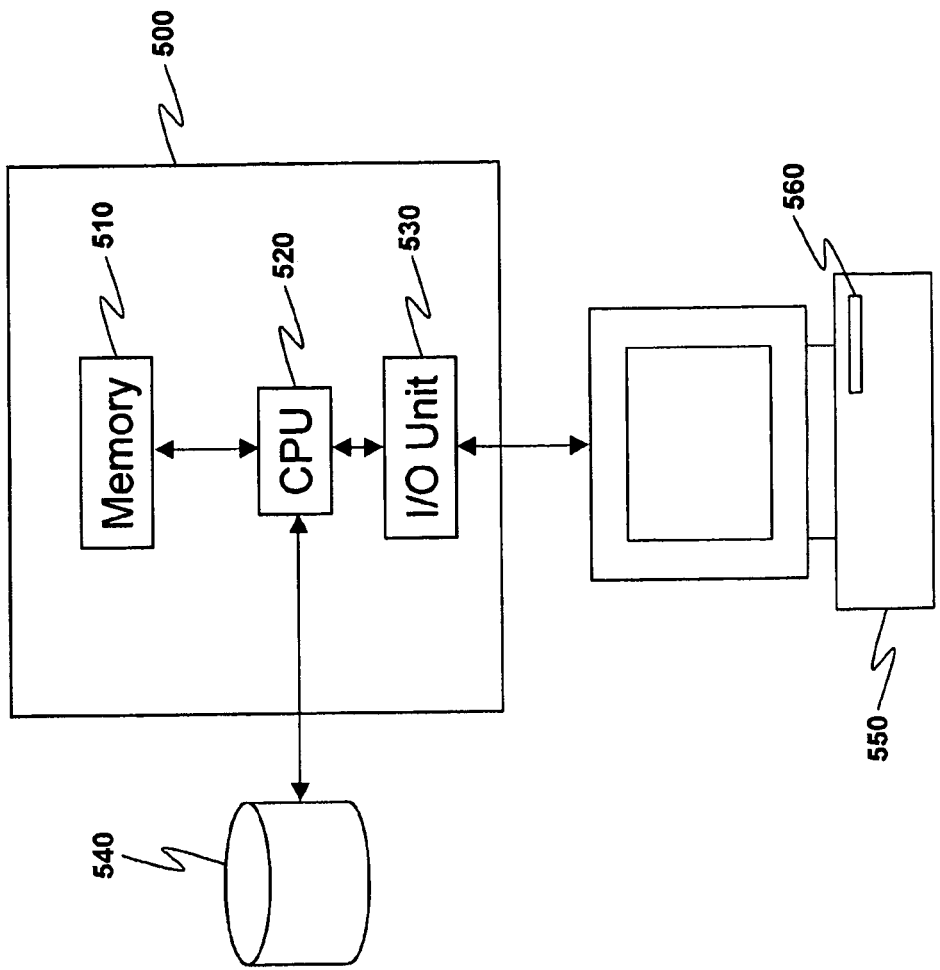
FIG. 5 is a block diagram illustrating a system which an end user typically employs to use the present invention.
Figure 6:
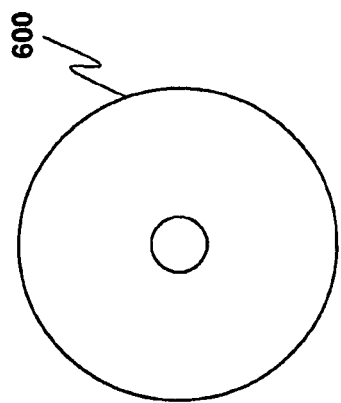
FIG. 6 illustrates one form of machine readable medium, a CD-ROM, on which program instructions for carrying out the steps of the present invention may be provided.

In any event an end user environment in which the present invention operates is shown in FIG. 5. The present invention operates through a data processing environment which effectively includes one or more of the computer elements shown in FIG. 5. While FIG. 5 is more suited for illustrating an end user environment, it is noted that a similar, albeit typically much larger, data processing system is connected via the Internet to the local environment depicted. In particular, a similar non-volatile memory 540 is typically present at the server end to contain program instructions for carrying out the virtual reality program which are loaded into a corresponding main memory 510 for execution. Turning to a local focus, computer 500 includes central processing unit (CPU) 520 which accesses programs and data stored within random access memory 510. Memory 510 is typically volatile in nature and accordingly such systems are provided with non-volatile memory typically in the form of rotatable magnetic memory 540. While memory 540 is preferably a nonvolatile magnetic device, other media may be employed. CPU 520 communicates with users at consoles such as terminal 550 through Input/Output unit 530. Terminal 550 is typically one of many, if not thousands, of consoles in communication with computer 500 through one or more I/O unit 530. In particular, console unit 550 is shown as having included therein device 560 for reading media of one or more types such as CD-ROM 600 shown in FIG. 6. Media 600, an example of which is shown in FIG. 6, comprises any convenient device including, but not limited to, magnetic media, optical storage devices and chips such as flash memory devices or so-called thumb drives. Disk 600 also represents a more generic distribution medium in the form of electrical signals used to transmit data bits which represent codes for the instructions discussed herein. While such transmitted signals may be ephemeral in nature they still, nonetheless constitute a physical medium carrying the coded instruction bits and are intended for permanent capture at the signal's destination or destinations.

While the invention has been described in detail herein in accordance with certain preferred embodiments thereof, many modifications and changes therein may be effected by those skilled in the art. Accordingly, it is intended by the appended claims to cover all such modifications and changes as fall within the spirit and scope of the invention.

What is claimed is:

1. A method for providing an appropriate user identity, said method comprising:
    obtaining an association between a first user and at least two name identifications for the first user, wherein each name identification of the at least two name identifications is an email alias of the user for email messaging in an email virtual environment, an instant messaging alias of the user for instant messaging in an instant messaging virtual environment, or an online gaming alias of the user for messaging in an online gaming virtual environment, and wherein each name identification of the at least two name identifications is for a different virtual environment of a plurality of disparate virtual environments comprising the email virtual environment, the instant messaging virtual environment, and the online gaming virtual environment;
    enabling a name conversion agent having target information and user defined rules related to use of the at least two name identifications;
    determining, by said name conversion agent using said target information, said user defined rules, and said association between the first user and the at least two name identifications for the first user, an appropriate user name identification of the at least two name identifications for use in sending an email or instant message by the first user from an online gaming virtual environment with which the first user interacts to an email or instant messaging virtual environment for a second user, the online gaming virtual environment and the email or instant messaging virtual environment being different virtual environments of the plurality of disparate virtual environments, wherein the determined user name identification is a different name identification than a currently active name identification for the first user in the online gaming virtual environment, and wherein the determined name identification is for a different virtual environment of the plurality of disparate virtual environments than the online gaming virtual environment; and
    associating the determined user name identification with the email or instant message from the online gaming virtual environment to the email or instant messaging virtual environment, wherein the message is sent from the online gaming virtual environment to the email or instant messaging virtual environment, and wherein the associating converts sender identity information of the email or instant message from the currently active name identification for the first user in the online gaming virtual environment to the determined name identification.

2. The method of claim 1, wherein said name conversion agent runs on a client machine.

3. The method of claim 1, further including providing a registration process in which the first user proves permission to use the at least two name identifications, wherein providing the registration process comprises, for each name identification of the at least two name identifications:
    receiving, by the name conversion agent, a message sent by the first user to the name conversion agent from the virtual environment for which the name identification is used;
    recognizing, by said name conversion agent, that the name identification is a new name identification for the first user; and
    adding that new name identification to a name conversion database so as to associate the new name identification with the first user, wherein the association establishes permission for the first user to use the new name identification.

4. The method of claim 3, further including establishing name association rules for communication with said second user.

5. The method of claim 3, in which data from the name conversion database is cached by the name conversion agent, whereby name conversions are made without the need to read the name conversion database for each message sent.

6. The method of claim 1, in which said rules comprise specific relationship rules and global rules.

7. The method of claim 6, in which said name conversion agent first looks for a specific relationship rule and applies it, and responsive to a specific relationship rule not being found, said name conversion agent looks for a global rule.

8. The method of claim 6, in which one of said specific rules permits said first user to specify the appropriate name identification to be associated with the email or instant message.

9. The method of claim 6, in which one of said specific rules requires a one-to-one correspondence between potential second users and said at least two name identifications for the first user.

10. The method of claim 6, in which one of said specific rules requires different name identifications to be provided to the same second user in differing virtual environments.

11. The method of claim 1, wherein the appropriate user name identification is chosen on the basis of a region in the online gaming virtual environment where the first user is located.

12. The method of claim 1, in which said appropriate user name identification is chosen on the basis of time of day, week or year.

13. The method of claim 1, wherein data from a name conversion database is cached by the name conversion agent, whereby name conversions are made without the need to read the name conversion database for each message sent, wherein one of said user defined rules requires different name identifications to be provided to the same second user in differing virtual environments of the email virtual environment, the instant messaging virtual environment, and the online gaming virtual environment, wherein the online gaming virtual environment is part of an online gaming virtual world, and wherein said appropriate user name identification is chosen on the basis of a region in the online gaming virtual environment in which the first user is located.

14. The method of claim 1, wherein the first user sends the message from within an online game of which the online gaming virtual environment is a part.

15. A computer program product for providing an appropriate user identity, the computer program product comprising:

one or more computer readable non-transitory storage devices and program instructions stored on at least one of the one or more storage devices, the program instructions comprising:

program instructions to obtain an association between a first user and at least two name identifications for the first user, wherein each name identification of the at least two name identifications is an email alias of the user for email messaging in an email virtual environment, an instant messaging alias of the user for instant messaging in an instant messaging virtual environment, or an online gaming alias of the user for messaging in an online gaming virtual environment, and wherein each name identification of the at least two name identifications is for a different virtual environment of a plurality of disparate virtual environments comprising the email virtual environment, the instant messaging virtual environment, and the online gaming virtual environment;

program instructions to enable a name conversion agent having target information and user defined rules related to use of said at two name identifications;

program instructions to determine, by the name conversion agent using the target information, the user defined rules and the association between the first user and the at least two name identifications for the first user, an appropriate user name identification of the at least two name identifications for use in sending an email or instant message by the first user from an online gaming virtual environment with which the first user interacts to an email or instant messaging virtual environment for a second user, the online gaming virtual environment and the email or instant messaging virtual environment being different virtual environments of the plurality of disparate virtual environments, wherein the determined user name identification is a different name identification than a currently active name identification for the first user in the online gaming virtual environment, and wherein the determined name identification is for a different virtual environment of the plurality of disparate virtual environments than the online gaming virtual environment; and program instructions to associate the determined user name identification with the email or instant message from the online gaming virtual environment to the email or instant messaging virtual environment, wherein the message is sent from the online gaining virtual environment to the email or instant messaging virtual environment, and wherein the associating converts sender identity information of the email or instant message from the currently active name identification for the first user in the online gaming virtual environment to the determined name identification.

16. The computer program product of claim 15, wherein the first user sends the message from within an online game of which the online gaming virtual environment is a part.

17. A computer system for facilitating providing an appropriate user identity in association with messaging in a virtualized universe environment, the computer system comprising:

one or more processors, one or more computer-readable memories, one or more computer-readable tangible storage devices, and program instructions stored on at least one of the one or more storage devices for execution by the at least one of the one or more processors via at least one of the one or more memories, the program instructions comprising:

program instructions to obtain an association between a first user and at least two name identifications for the first user, wherein each name identification of the at least two name identifications is an email alias of the user for email messaging in an email virtual environment, an instant messaging alias of the user for instant messaging in an instant messaging virtual environment, or an online gaming alias of the user for messaging in an online gaming virtual environment, and wherein each name identification of the at least two name identifications is for a different virtual environment of a plurality of disparate virtual environments comprising the email virtual environment, the instant messaging virtual environment, and the online gaming virtual environment;

program instructions to enable a name conversion agent having target information and user defined rules for the at two name identifications;

program instructions to determine, by the name conversion agent using the target information, the user defined rules, and the association between the first user and the at least two name identifications for the first user, an appropriate user name identification of the at least two name identifications for use in sending an email or instant message by the first user from an online gaming virtual environment with which the first user interacts to an email or instant messaging virtual environment for a second user, the online gaming virtual environment and the email or instant messy in virtual environment being different virtual environments of the plurality of disparate virtual environments, wherein the determined user name identification is a different name identification than a currently active name identification for the first user in the online gaming virtual environment, and wherein the determined name identification is for a different virtual environment of the plurality of disparate virtual environments than the online gaming virtual environment; and program instructions to associate the determined user name identification with the email or instant message from the online gaming virtual environment to the email or instant messaging virtual environment, wherein the message is sent from the online gaming virtual environment to the email or instant messaging virtual environment, and wherein the associating converts sender identity information of the email or instant message from the currently active name identification for the first user in the online gaming virtual environment to the determined name identification.

18. The computer system of claim 17, wherein the first user sends the message from within an online game of which the online gaming virtual environment is a part.

* * * * *